(12) United States Patent
Tomasi et al.

(10) Patent No.: US 6,314,349 B1
(45) Date of Patent: Nov. 6, 2001

(54) LANDMASS FLY-AROUND BOUNDARY GENERATION

(75) Inventors: Steven W. Tomasi, Windham, NH (US); Karen Benevides, Tiverton; Jeffrey Roy, Portsmouth, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/226,632

(22) Filed: Dec. 21, 1998

(51) Int. Cl.7 .................................................. G06F 7/00
(52) U.S. Cl. .................................. 701/23; 701/300; 702/5
(58) Field of Search ............................... 701/1, 3, 23, 25, 701/26, 200, 201, 202, 205, 208, 209, 300; 244/3.1; 340/990, 995; 73/178 R; 702/5

(56) References Cited

U.S. PATENT DOCUMENTS 5,150,295 * 9/1992 Mattingly .................................. 702/5

* cited by examiner

Primary Examiner—William A. Cuchlinski, Jr.
Assistant Examiner—Edward Pipala
(74) Attorney, Agent, or Firm—Michael J. McGowan; Prithvi C. Lall; Michael F. Oglo

(57) ABSTRACT

A process for generating fly-around boundaries for use by projectiles such as missiles or the like which facilitates the steps of providing original cartographic data representative of at least one geographical position on a landmass and providing a predetermined value for the spacing of a fly-around boundary from the geographical position; digitizing the original data and creating a landmass model in a format which includes latitudinal and longitudinal coordinates of the geographical position; inputting the digitized data and the predetermined value into a data analyzer; generating new data representative of the fly-around boundary using the data analyzer based on the predetermined value and the land mass model, preferably by offsetting fly-around segments from the landmass model a distance equal to the predetermined value; and providing a navigational control for receiving the new data and using the new data for controlling the flight path of the missile along the boundary.

20 Claims, 13 Drawing Sheets

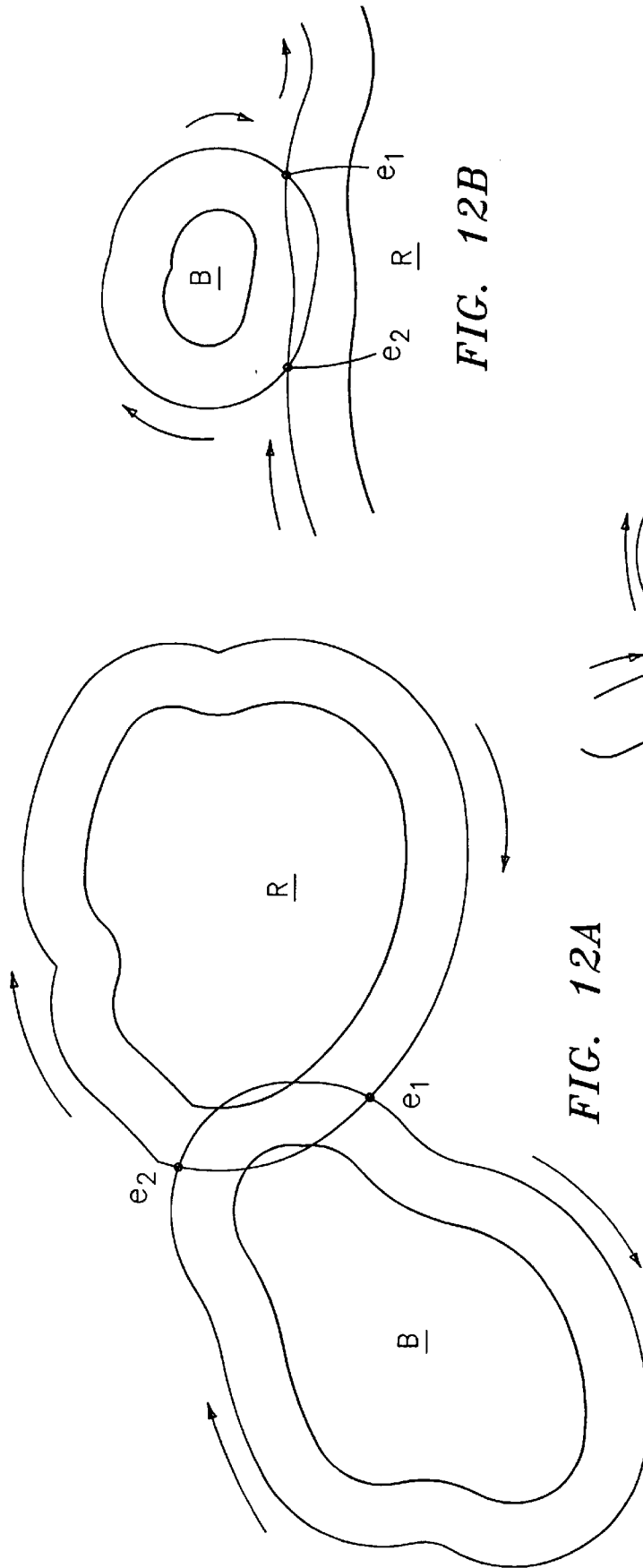
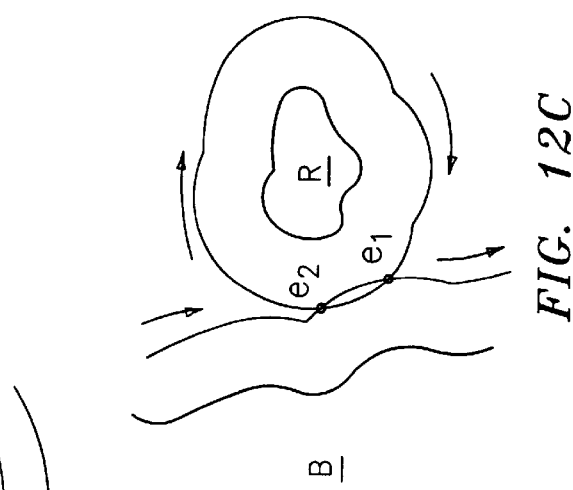
FIG. 12B
FIG. 12C
FIG. 12A

LANDMASS FLY-AROUND BOUNDARY GENERATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention is directed to guidance systems and processes, and more particularly, to a process for generating fly-around boundaries relative landmasses for projectiles such as missiles.

(2) Description of the Prior Art

Automated flight missiles such as the Tomahawk missile typically include guidance systems which are preprogrammed for guiding the missile to its destination. In order to avoid radar, defenses and to maintain rules of engagement, the missiles are programmed to fly at a standoff distance from the coastline of landmasses. With currently available technology, operators of the missiles or guidance systems work to manually calculate and plot fly-around boundary distances from selective landmasses in order to identify missile waypoint positions. This process is time consuming and results in over-estimated fly-around boundary distances which increase the length of the flight path, thus reducing the missile's capability.

The prior art includes U.S. Pat. No. 5,150,295 directed to a computerized system for joining individual maps into a single map product. It discloses an improved process for making a larger map from individual 7.5 digital line graph (DLG) data. The process is fully automated and performed by computer with minimal human interaction, eliminating errors and producing a more accurate final map product. The process includes conversion of the raw DLG data files into ARC/INFO format, locating the border arcs of each individual data set, edgematching the individual map data sets, and joining the data sets into a single, large map coverage. Any node along the border arc which cannot automatically be edgematched is noted in a special error file. A geographer then matches the unmatched edges which contain an error in the input data. A large map product is provided as the product of the process. However, nothing is disclosed in this patent related to the automated production of fly-around boundaries relative landmasses.

There exists a need for a process for automatically computing fly-around boundaries relative to any form of landmass based on cartographic data inputted into the process.

SUMMARY OF THE INVENTION

The primary object of this invention is to provide an automated process for determining fly-around boundaries relative to any form of landmass for the guidance of projectiles or the like.

Another object of this invention is to provide an automated process for creating fly-around boundaries which produces a flight path defined by the boundaries by eliminating small harbors and inlets of coastlines from a model of a landmass coastline.

Still another object of this invention is to provide a process for automatically creating fly-around boundaries based on a desired standoff distance from a landmass coastline.

Still another object of this invention is to provide a process for creating fly-around boundaries for landmasses, which combines the fly-around boundaries for adjacent intersecting landmass boundaries into a resultant fly-around boundary, depending upon the proximity of the landmass boundaries.

The foregoing objects are attained by the process of the present invention for generating fly-around boundaries for use by projectiles or the like, comprising the steps of providing original cartographic data representative of at least one geographical position on a landmass and providing a predetermined value for the spacing of a fly-around boundary from the geographical position; digitizing the original cartographic data and creating a landmass model in a format which includes latitudinal and longitudinal coordinates of the geographical position; using as an input the digitized data and the predetermined value into a means for analyzing the digitized data; generating new data representative of the fly-around boundary based on the predetermined value and the land mass model, via the analyzing means; and providing a navigational control means for steering the projectile and using as input the new data into the navigational control means for controlling the flight path of the projectile along the boundary.

The process of the present invention further includes the filtered landmass model having a landmass side and a water side. The step of generating fly-around boundaries further comprises the step of offsetting original fly-around segments from segments generated from said new data by a distance equal to the predetermined value at an orientation substantially parallel to the segments and toward said water side for setting a fly-around boundary.

The process of the present invention further includes the cartographic data being provided for a plurality of landmasses, wherein the means for analyzing carries out the steps of determining the fly-around segments for each of the plurality of landmasses and combining the fly-around segments of each of the plurality of landmasses for creating a resultant fly-around boundary.

The details of the present invention are set out in the following description and drawings wherein like reference characters depict like elements.

BRIEF DESCRIPTION OF THE DRAWINGS

FIGS. 12A, 12B and 12C are diagrams of particular types of landmasses having intersecting fly-around boundaries and illustrate the process for creating combined boundaries.

DETAILED DESCRIPTION OF THE PREFERRED EMBODIMENT

Figure 1:
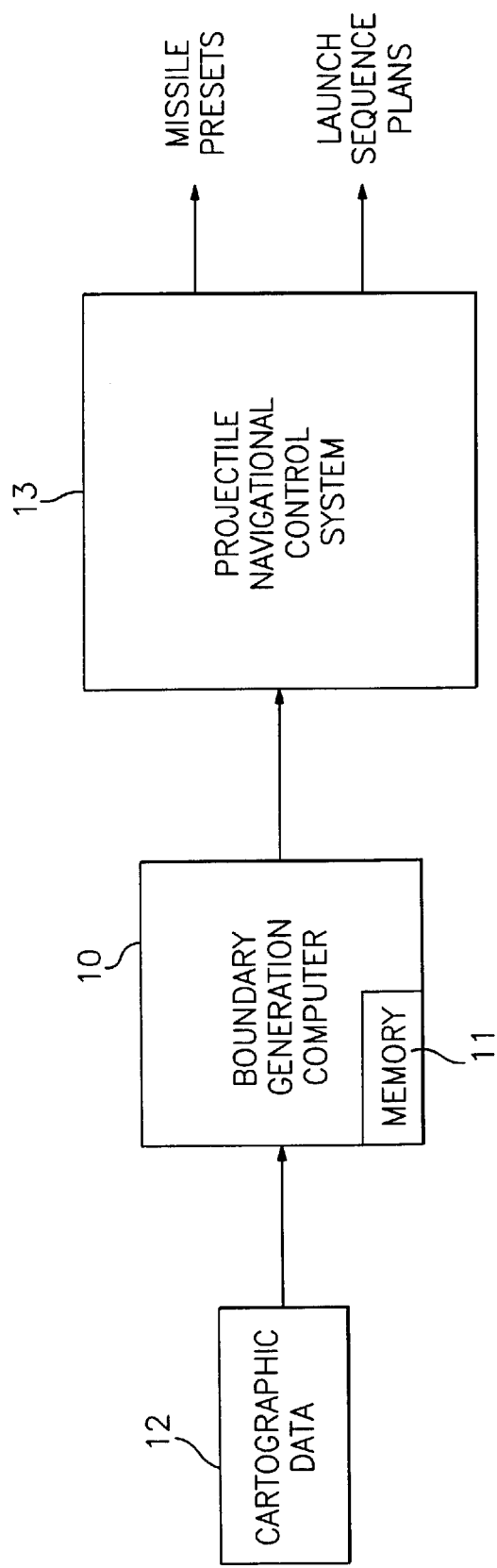
FIG. 1 is a schematic view of an operating system in which the process of the present invention can be used.

FIG. 1 is a schematic diagram of a navigational control or planning system in which the landmass fly-around boundary process of the present invention is utilized. The landmass boundary generation process is implemented with the aid of a computer 10 associated with a large navigational control system 13 used to plan the flight path and automatic engagement of a projectile such as a missile.

The process steps discussed below for FIGS. 2A and 2B, 4A and 4B and FIG. 11 are implemented using computer 10, which may be of any applicable kind in the art. Accordingly, with respect to the present invention, cartographic data and a desired standoff distance S (see FIG. 6) are used as input into a storage or memory device 11 associated with computer 10 for use by the process of the present invention. The cartographic data is representative of geographical points along a coastline, wherein each point represented by the data covers a given landmass area. The points are generally indicative of points along the landmass where direction changes occur. The standoff distance is preferably selected by a system operator and represents a distance which is usually sufficient for the avoidance of radar and/or defenses originating from the landmass adjacent which the projectile is to fly, allowing for navigation error and for meeting other rules of engagement. The standoff distance may be further affected by environmental conditions such as inclement weather and the like and as such may be adjusted by the operator.

The process of the present invention functions to calculate landmass fly-around boundaries relative to various types of landmasses so that missiles or the like can be maintained in an automated fashion at the desired standoff distance. The fly-around boundaries can be displayed on a video screen or other display device (not shown) associated with computer 10 for use by the operator to define, redefine or adjust the boundaries. Information calculated by the boundary generation process of the present invention may loaded into a projectile navigational control system and used to determine missile presets or launch sequence plans. The navigation control system and the manner in which the missile presets or launch sequence are determined do not form part of the present invention.

Figure 2A:
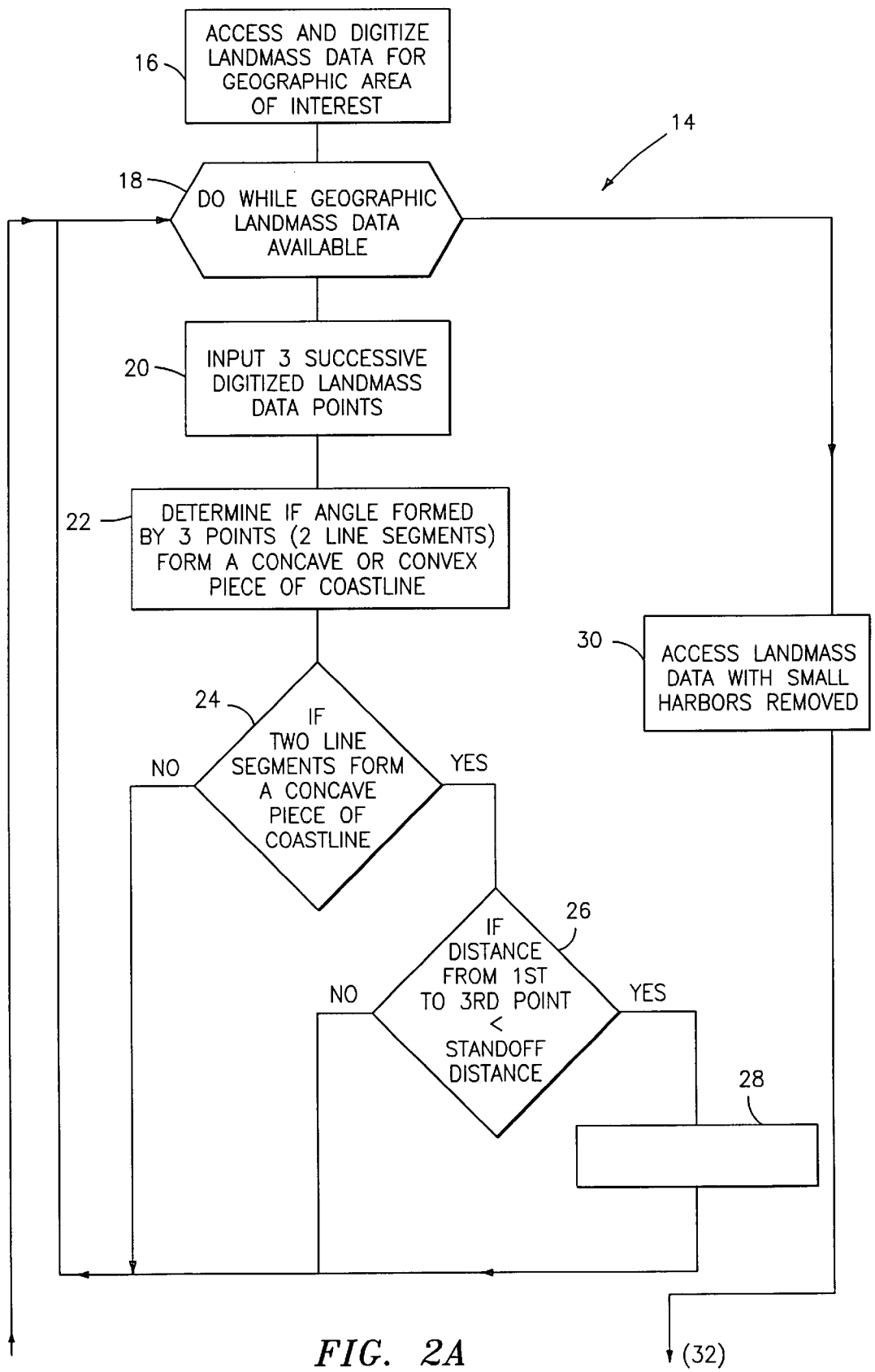
FIGS. 2A and 2B are flow diagrams of one tier of the process performed by the process of the present invention directed to the elimination of small harbors or inlets and the like from a landmass model.
Figure 2B:
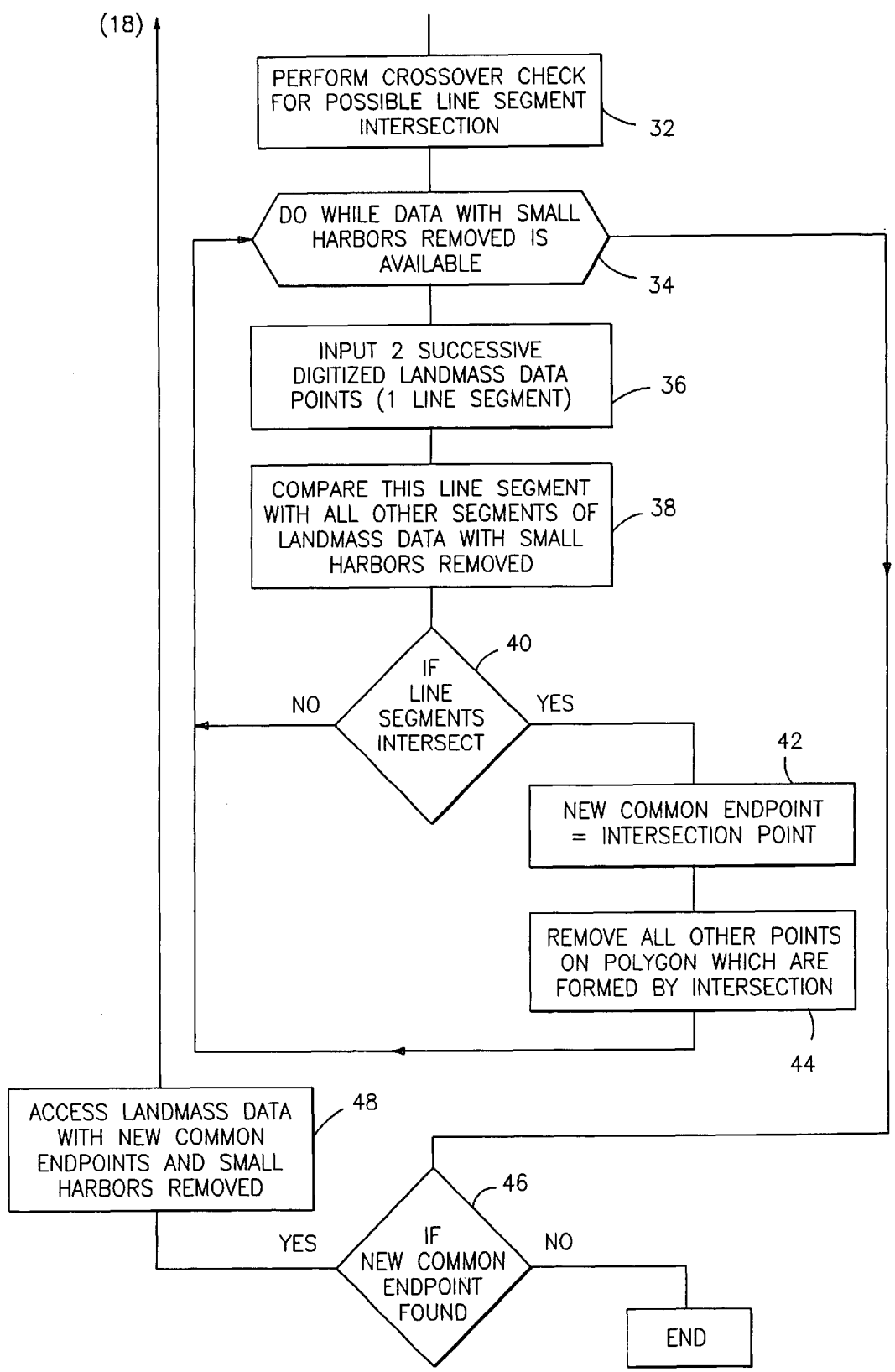

The first tier of the landmass boundary process of the present invention, which is implemented with the assistance of computer 10, is the sub-process 14 shown in the flow chart illustrated in FIGS. 2A and 2B. This part of the process uses original cartographic or landmass data from device 12 which defines the world vector shoreline (WVS) which is digitized via a digitizer (not shown) into a format including latitudinal and longitudinal coordinates of geographical positions. The digitized cartographic data for particular types of landmasses are categorized in data files in device 12 for retrieval by computer 10 and stored in memory 11 for by sub-process 14 of FIGS. 2A and 2B. By way of sub-process 14, cartographic data is analyzed and processed for removing points therefrom which are not required.

Points which are not required are determined by the shape of the coastline, wherein points of data representing small harbors or other inlets along the coastline or the like are removed via sub-process 14 based on their smaller size relative the general configuration of a larger section of landmass to which they belong. This is discussed more specifically below.

In step 16, the original cartographic data is accessed for the geographic area of interest. In step 18, the process is initiated. Since the landmass data for the geographic area of interest is processed in small pieces, step 18 is actually a test to determine if the process is complete. This process continues until all landmass harbor and cross-overs are removed. In step 20, the points representing the digitized cartographic data are processed. Referring to the schematic representation of a coastline model shown in FIG. 3A, three successive points at a time including a starting end point (1st point), e.g., point A, an intermediate point (2nd point), e.g., point B, and a finishing end point (3rd point), e.g., point C, are analyzed in a sequential, preferably clockwise manner beginning with an entry point for the landmass model, e.g., point A, and ending with an exit point of the model, e.g., point K, in this step. During the sequential processing of the points, the intermediate point becomes the starting end point for the next three points unless it is removed as discussed below and the finishing end point becomes a starting end point in the next set of three points analyzed in the sequence. The three points are used in step 22 to determine if the landmass section represented by the three points is a first or second type of configuration, i.e. a concave configuration or a second type convex configuration, respectively.

In categorizing the configuration of the landmass represented by three points, and moving in a clockwise direction, for every three points and the segments defined thereby, right hand turns are considered convex and left hand turns are considered concave. Accordingly, and referring to FIG. 3A, following points A, B and C sequentially, the path represented by these points defines a right hand turn while the path represented by points B, C and D defines a left hand turn.

Figure 3A:
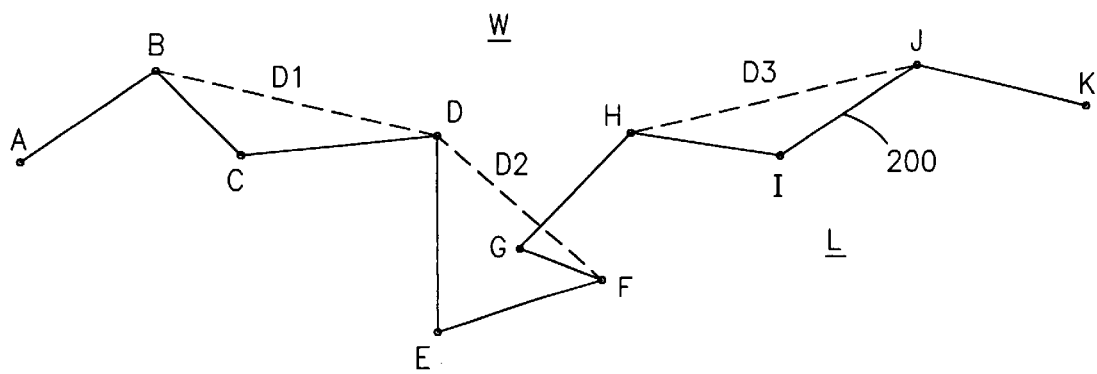
FIGS. 3A, 3B and 3C are schematic diagrams of a coastline and illustrate the results of the sequence of steps carried out by the process of FIGS. 2A and 2B for removing small harbors and the like and cross overs from the landmass model.

Accordingly, and referring by way of example to FIG. 3A, wherein coordinates of actual geographical points along a real coastline are shown, every three points along coastline model 200 are in either a convex or concave directional configuration. The concavely configured sections include potentially removable small harbors and the like.

Points A, B and C represent a right hand turn and a convexly configured section of landmass; points B, C and D represent a left hand turn and a concavely configured section of landmass; points C, D and E represent a right hand turn and a convexly configured section of landmass; points D, E and F represent a left hand turn and a concavely configured section of landmass; points E, F and G represent a left hand turn and a concavely configured section of landmass; points F, G and H represent a right hand turn and a convexly configured section of landmass; points G, H and I represent a right hand turn and a convexly configured section of landmass; points H, I and J represent a left hand turn and a concavely configured section of landmass; and points I, J and K represent a right hand turn and a convexly configured section of landmass.

In step 24, if the three points and the segments thereby represent a convex configuration, for example segments AB and BC defined by points A, B and C, the process is returned back to step 18. Such is the case for segments AB and BC. If, however, the segments defined by the three points represent a concave configuration, for example, as do segments BC and CD defined by points B, C and D, the process moves on to step 26.

For every three points where the first and third points are separated by less than the standoff distance, the fly around boundaries which would be generated therefor without removal of the second point from the landmass model, would include very small concave configurations detouring minimally from the remaining portion of the boundary. Accordingly such harbors are removed to avoid such minimal detours and simplify the would be fly around boundary developed from the landmass model, because the increase in distance over the required offset from the landmass model is minimal. It should be noted that if a convex point (i.e., harbors not meeting the criterion is removed when it should not have been removed, the resultant fly-around boundary would be generated more than the stand off distance away from the original land and fly-around boundary will not be accurate and thus the profile of the land mass will not be accurate.

The sections of coastline such as that represented by points B, C and D in FIG. 3A are examined in step 26 to determine whether the intermediate or vertex point formed between the two segments, i.e. point C, can be removed for reducing the overall length of the fly-around boundary. If the distance from the starting end point, for example end point B, to the finishing end point, for example end point D, is less than the predetermined standoff distance, the vertex or intermediate point, for example point C, is eliminated in step 28, thus updating the original cartographic data.

FIG. 3A is further illustrative of the process represented by steps 24–28 for removing points from coastline model 200. The removal of the intermediate or vertex point does not alter the accuracy of the fly-around boundary since the resulting boundary would encompass the concave section of coastline anyway. After points B, C and D, the process begins again at step 18 moving on to the next set of three points, D, E and F since point C was removed.

In FIG. 3A, direct distance D1, D2 and D3 represent the distances which are compared against a predetermined value, preferably the standoff distance. For example, for points B, C and D, the distance D1 is less than the standoff distance stored in memory 11 and accordingly, intermediate point C is removed, thus updating the digitized data representing the coastline, forming new data and beginning the formation of the resultant coastline model 202, shown in FIG. 3B. The new data is stored in memory 11, shown schematically in FIG. 1, and by operation of step 28, the new data is connected by segments, thus reconfiguring the landmass model and creating a resultant landmass model.

Figure 3B:
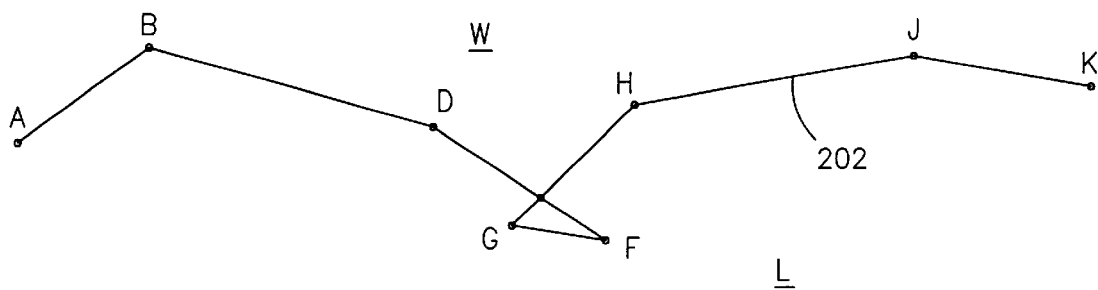

FIG. 3B represents a resultant coastline or landmass model 202. Intermediate points C, E and I were removed from coastline model 200 based on step 26 wherein the distances D1, D2 and D3 were less than the standoff distance. The resultant coastline model 202 is represented by points A, B, D, F, G, H, J and K, wherein these points are also connected by segments via the process step 28. Convexly configured sections of the coastline are not removed or altered. After the completion of the analysis of the configurations of all sections of coastline model 200 represented sequentially by three points, in step 30, the data representing the resultant coastline or landmass model 202, as shown in FIG. 3B, with small harbors and the like removed, is accessed for the initiation of a cross-over check in step 32 of FIG. 2B.

Cross-overs can occur when points are removed from the coastline model 200 and new segments are added to connect the remaining points. Cross-overs are created by segment intersections. Referring to FIGS. 3A and 3B, an example of this situation occurs when point E is removed, which further removes original segments DE and EF from coastline model 200. The landmass configuration defined by segments DF and FG, and FG and GH in FIG. 3B are now convex. However, segment DF and segment GH intersect forming a polygon including portions of segments DF and GH and segment FG.

Figure 3C:
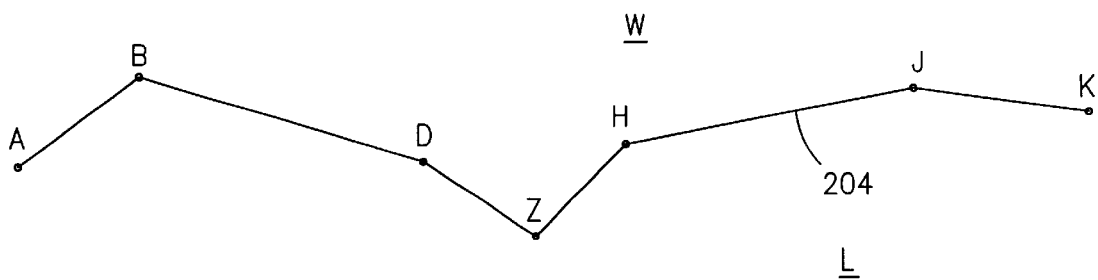

In steps 34, 36 and 38 the cross-over check involves comparing each segment remaining in resultant coastline model 202 with all other segments of resultant coastline model 202 for determining any non-endpoint intersections. Two successive data points are used as input in step 36 which are representative of one line segment such as segment DF. Segment DF is preferably compared with all other segments of resultant coastline model 202 such as, for example, with segment GH in step 38. In step 40, the process is directed back to step 34 if no intersection is found. If an intersection is found, the process is directed to step 42 wherein a new common point Z, shown in FIG. 3C, is added to resultant coastline model 202 at the non-endpoint intersection point between the intersecting segments DF and GH. In step 42, the intersection point Z becomes a new common end point of the intersecting line segments. In step 44, except for the new common end point Z, as shown in FIG. 3C, all points and segments on the polygon formed originating from point Z and directed away from water side W and toward land side L, are removed. Accordingly, FIG. 3C is representative of a near filtered coastline model defined by points A, B, D, Z, H, J, and K wherein all initial small harbors and cross-overs have been removed.

If a new common end point at a line segment intersection was added in process steps 36–44, in step 46, the process is directed to step 48 for accessing the near filtered coastline data as illustrated by the near filtered landmass model in FIG. 3C, with the new common end points and small harbors removed, for reprocessing through the entire process starting with step 18, as described above to recheck for small harbors and cross overs. The repetition of the process starting from step 18 is preferable since removing points and adding new common end points as performed in steps 36–44 alters the coastline configuration and creates new concave/convex coastline configurations.

A filtered coastline model 204 is achieved including points and segments when all points are processed without small harbors and cross-over conditions existing, as shown in FIG. 3C. Data representing filtered coastline 204 is stored in the memory 11 of the computer 10, shown in FIG. 1. The filtered data representing filtered coastline model 204 can now be accessed from memory 11 and used as a reference for offsetting fly around segments and generating fly-around boundaries.

Figure 4A:
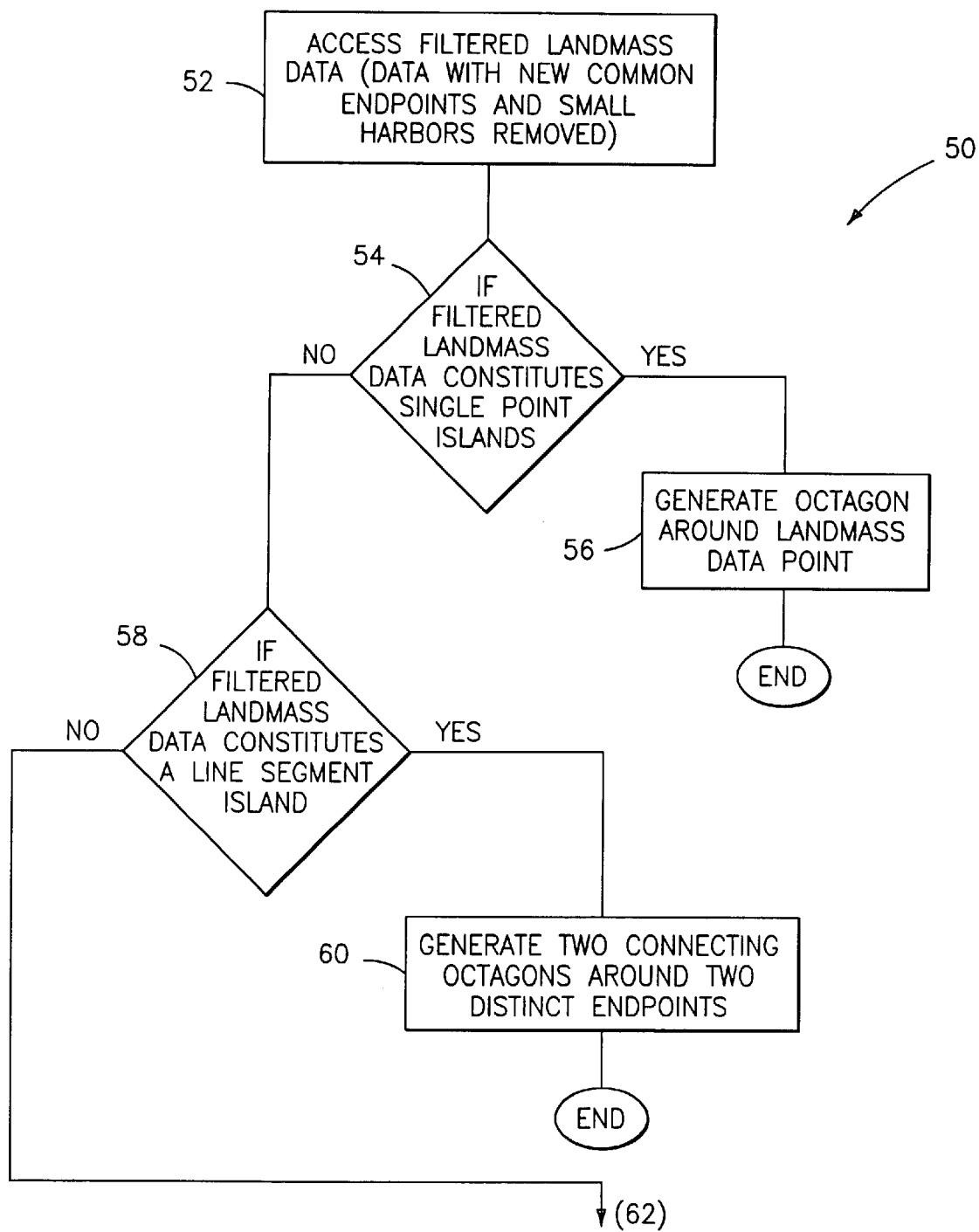
FIGS. 4A, 4B and 4C represent a flow diagram of a second tier of the process carried out by the process of the present invention for creating fly-around boundaries relative the landmass model resulting from the process outlined in FIGS. 2A and 2B.
Figure 4B:
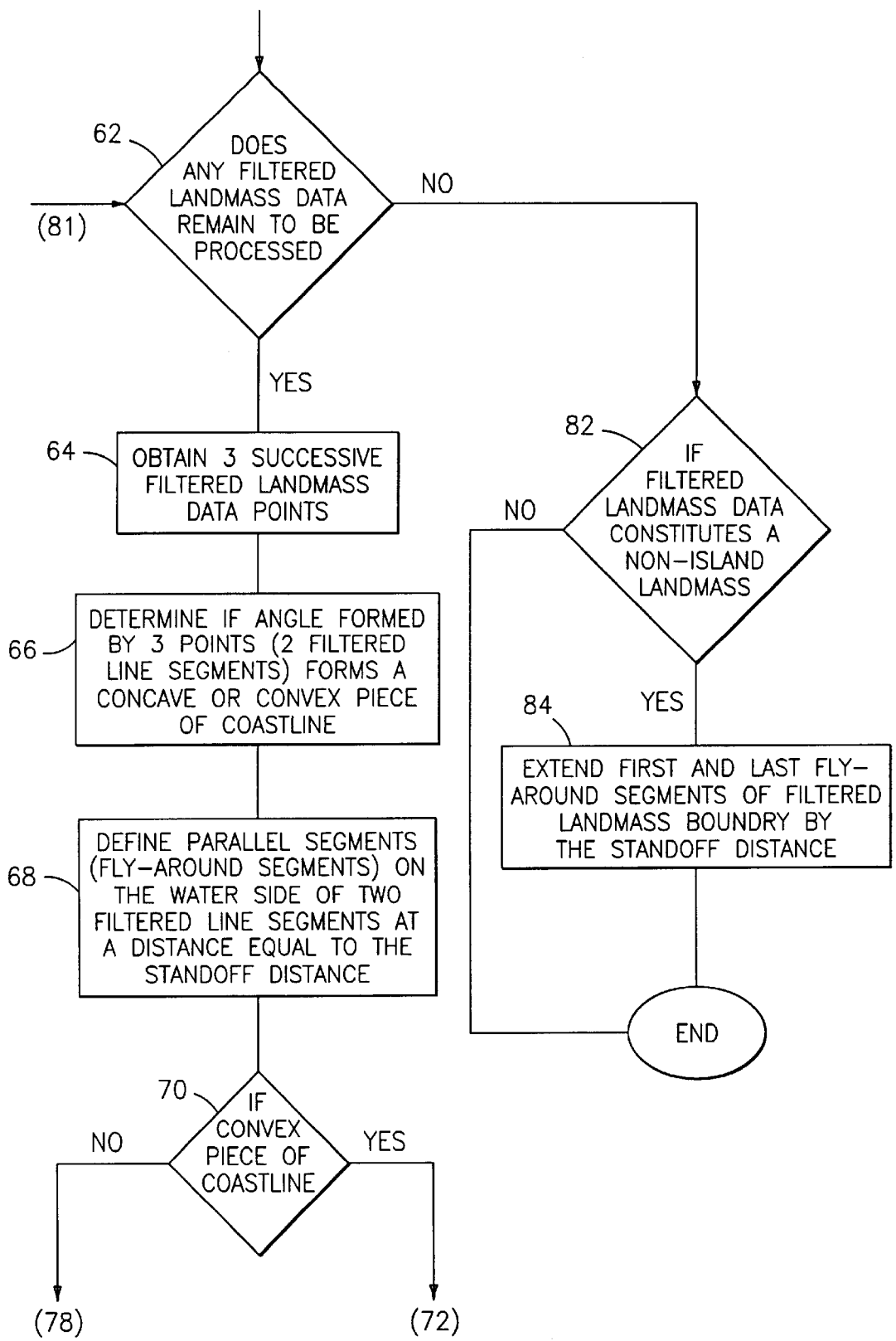
Figure 4C:
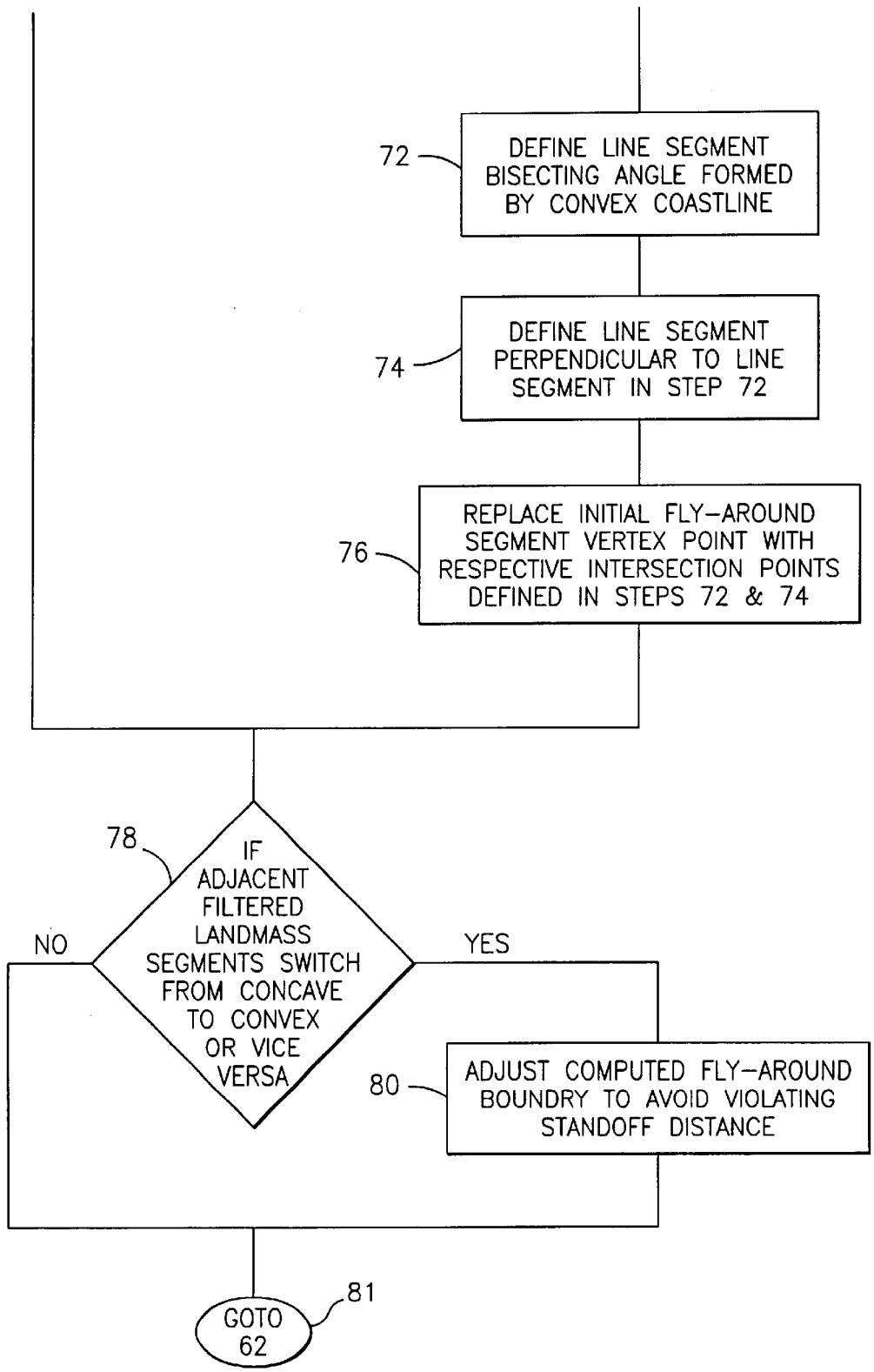

In sub-process 50 implemented by computer 10, represented by the flow charts shown in FIGS. 4A, 4B and 4C, fly-around boundaries are generated. The purpose of creating fly-around boundaries is to generate a boundary around each filtered coastline or landmass at an operator's specified predetermined value or standoff distance at which a projectile such as a missile or the like is to be maintained in flight. The filtered landmass data representative of filtered coastline model 204 derived from sub-process 14 discussed above is used for sub-process 50.

In step 52 of FIG. 4A, filtered landmass or coastline data having new common end points and small harbors removed is accessed from the memory 11 of the computer 10, shown schematically in FIG. 1. Boundary generation sub-process 50 is applicable to all types of landmasses including multiple point islands, multiple point non-island landmasses, single point islands and line segment islands. For the purpose of this description, a multiple point island landmass is defined as an island which can only be defined by a plurality of non-linear points, given the area of land mass in which one point defines the landmass; a multiple point non-island landmass generally defines a section of non-island coastline; a single point island landmass is defined as a relatively small island which can be defined by one point, given the area of land mass in which one point defines the landmass; and a line segment island landmass typically defines an elongated very narrow island having a width definable by single points, given the area of landmass in which one point defines the landmass. For the latter two types of landmasses, a specialized portion of sub-process 50 is used for generating the fly-around boundaries.

In step 54, the process is directed to step 56 if a single point island is being analyzed or the process is directed to step 58 if a line segment island or other type of landmass is being analyzed. A line segment island is defined by 3 consecutive points where the first point and the third point are identical.

Figure 5A:
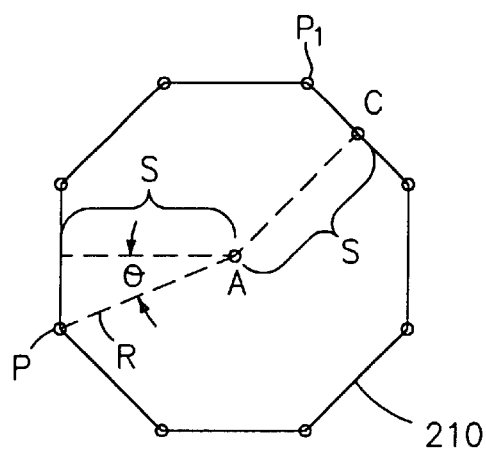
FIGS. 5A and 5B are schematic diagrams of fly-around boundaries for particular types of landmasses including a single point island and a line segment island.

In step 56, if only a single point representative of a single point island is being analyzed as shown in FIG. 5A, a polygon preferably having equal length connected sides, preferably in the form of an octagon 210, is preferably generated around the single digitized point A, as illustrated in FIG. 5A. The octagon is generated with the single landmass point in the center. The connected sides of octagon 210 are representative of original fly-around segments, and the center point C of each side or fly around segment is separated from the single point at a distance equal to the standoff distance S.

To generate the octagon, the eight endpoints P are established around center point C using the standoff distance S and the angle 2θ representing the angle between the endpoints of each side of the octagon, where the center point C of each side is offset the standoff distance S from center point A. Accordingly, angle 2θ is known at 40°, wherein θ equals 20°. From these known parameters, the radius R can be determined by the formula R=D/COS θ. The points can be generated for octagon 210 with point A as the origin and starting at 0°. A first point P1 is plotted first at 20° at the end of the known radius R. Seven more points P are plotted 40° apart, each at the end of the known radius R.

Figure 5B:
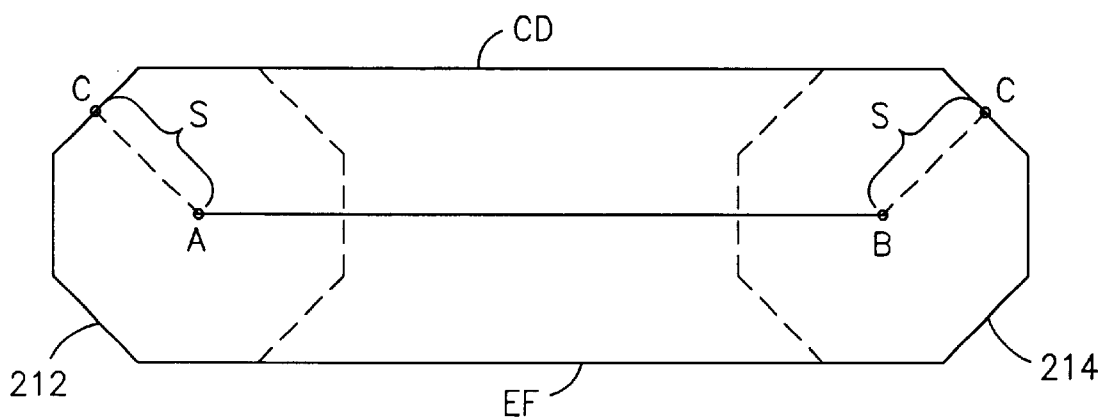

Alternatively, if the landmass is not a single data point, the process is directed to step 58. If the filtered landmass data or model constitutes a line segment island, as defined above, such as that shown in FIG. 5B, a fly-around boundary is preferably created in step 60 by generating two octagons 212 and 214, as discussed above for FIG. 5A. Octagons 212 and 214 have preferably equal length connected sides representative of original fly-around segments and are generated around each endpoint A and B of the line segment island, wherein as before the center points C of each side of each octagon is located the standoff distance S from the endpoint. The octagons are connected with additional fly-around segments CD and EF placed substantially parallel to the periphery of the line segment island. Points and segments or portions thereof comprising the sides of the octagons, as shown by the dotted lines in FIG. 5B, and located between the additional fly-around segments, are eliminated. If the filtered landmass model does not constitute a line segment island, the process is forwarded to step 62, as shown in FIG. 4B.

In step 62, if additional data exists for processing, i.e., boundary generation is not complete due to (1) the data not being representative of a line segment island or a single point island, or (2) at least one more set of three points exists in the sequence of points for processing, the process moves to step 64. Otherwise the process moves to step 82, discussed below.

The process beginning with step 64 analyzes three successive points at a time of the filtered landmass model 204, as discussed above in detail for sub-process 14, wherein the three successive points represent either a convex or concave landmass configuration. In step 66, therefore, based on the three points obtained in step 64, the process determines whether or not the section of landmass represented by the three points from the filtered landmass model forms a concavely or convexly configured section of the coastline. The process of step 66 is the same as that described above for process 14 and shown in FIG. 2A, step 24.

In step 68, to define the fly-around boundary, infinitely long line segments are offset in a parallel orientation from the segments of filtered coastline model 204. Each infinitely long line segment intersects with the infinitely long line segment offset from an adjacent filtered coastline model segment. For convex configurations, the portions of the infinitely long segments extending past the intersection point with adjacent infinitely long segments are removed in steps 72–76. For concave configurations, the portions of the infinitely long segments extending past the intersection point with adjacent infinitely long segments are removed as discussed below in step 78.

Figure 6:
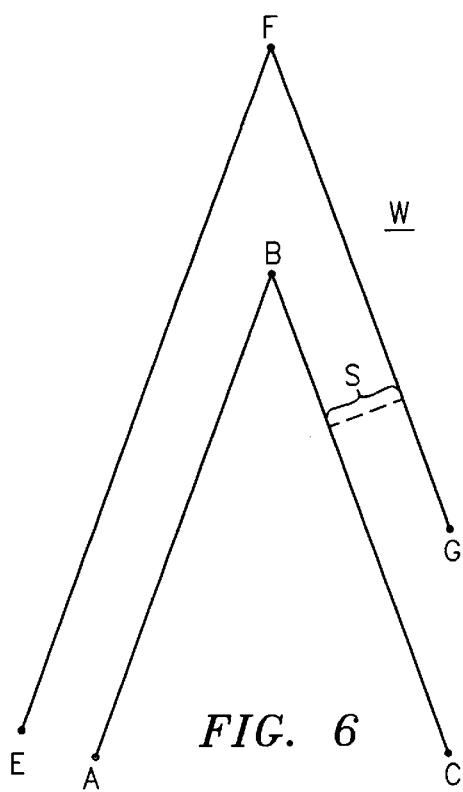
FIG. 6 is a schematic representation of a fly-around boundary created for a landmass having a convex configuration.
Figure 7:
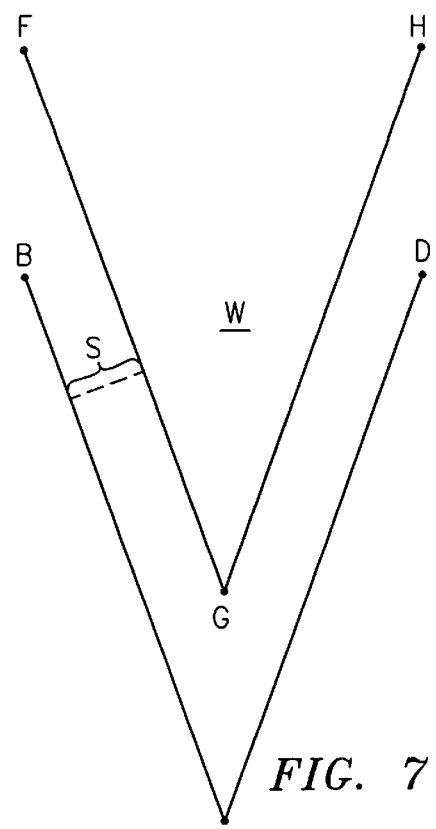
FIG. 7 is a schematic representation of a fly-around boundary created for a landmass having a concave configuration.

Steps 68–76 are illustrated in FIGS. 6 and 7, wherein original fly-around segments EF and FG are offset from segments AB and BC, respectively, of filtered landmass or coastline model 204. In step 68, fly-around segments EF and FG are offset in a sequential manner from segments AB and BC toward water side W a distance equal to the standoff distance S. As an example of this sequential manner, each set of two segments includes a starting segment, e.g., AB, and a finishing segment, e.g., BC, wherein the finishing segment BC becomes the starting segment in the next set of segments subject to offset, e.g., segments BC and CD, having original fly around segments FG and GH offset therefrom, as shown in FIG. 7. The water side W of the segments of the filtered coastline model is on the left side of the segments when viewing points sequentially in a clockwise direction.

From step 68 the process is directed to step 70 whereat if a convex configuration was found in step 66, the process is further directed to step 72. If not, the process is directed to step 78, discussed below.

Figure 8:
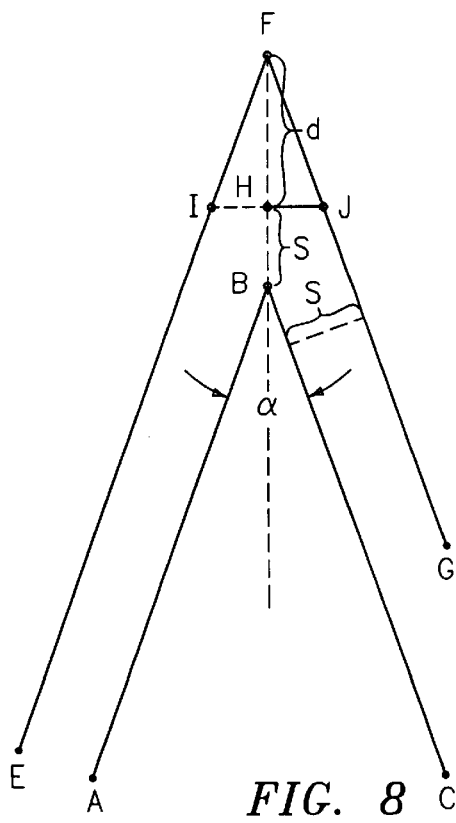
FIG. 8 is a schematic representation similar to FIG. 6 showing the fly-around boundary created for a convex segment of landmass and also indicating steps in the process of the present invention for correcting standoff error associated with fly-around boundaries for convexly configured landscapes.

For landmasses with convex configurations or coastlines as shown in FIGS. 6 and 8, an error results in the offsetting of the original fly-around segments from the segments at the apex area of the convex configurations of the fly around boundaries, and accordingly, the fly-around boundary must be adjusted. The resulting error can be described with reference to FIG. 8.

FIG. 8 shows a filtered section of landmass with convex configuration model defined by points A, B and C and the adjoining segments AB and BC, wherein point B is the vertex. The fly-around boundary is represented by points E, F and G and the adjoining original fly-around segments EF and FG, wherein point F is the initial vertex of the fly-around boundary, wherein portions of segments EF and FG extending toward the water beyond vertex point F are eliminated. Point F of the fly-around boundary is offset from vertex B a distance d greater than the standoff distance S, an error inherently associated with the offsetting process. Distance d represents an offset error, which, if not corrected, will result in an unnecessarily lengthened fly-around boundary. For convexly configured landmasses, the error increases as the angle a between the segments becomes more acute. The following adjustments must be performed on convexly configured landmasses or sections of coastline beginning at step 72.

In step 72, a line segment is defined which bisects the angle α formed by the convexly arranged landmass segments AB and BC, extending a distance equal to the standoff distance from vertex point B, as defined by segment BH in FIG. 8. In step 74, a line segment perpendicular to segment BH and offset a distance equal to the standoff distance from the vertex B is provided as defined by segment IJ, which also intersects with original fly-around segments EF and FG, respectively. Referring to step 76 and FIG. 8, the initial fly-around boundary vertex point E and portions of original fly-around segments extending beyond segment IJ, i.e. segments IF and FJ, are eliminated and replaced by new fly-around segment IJ, creating a new fly-around boundary. Accordingly, points E, I, J, and G in FIG. 8 denote the new fly-around points and new fly-around boundary after the error is corrected. For concavely configured landmasses or sections of coastline, the fly-around vertex point is used without modification as there is no error introduced via sub-process 50.

Because of the addition of extra data points, for example, points H and I, for convexly configured landmasses or sections of coastline necessary for the elimination of standoff distance error, the number of points in the landmass in which the fly-around vertex error has been corrected, is increased. Because of the additional points, new errors can arise, wherein the additional points can violate the standoff distance offset requirements of segments of adjacent landmass configurations. The new error is preferably corrected as set forth beginning in step 78. Such errors occur when consecutive sets of segments representing filtered landmass models or coastline sections switch from concave to convex configurations or vice-versa.

Figure 9:
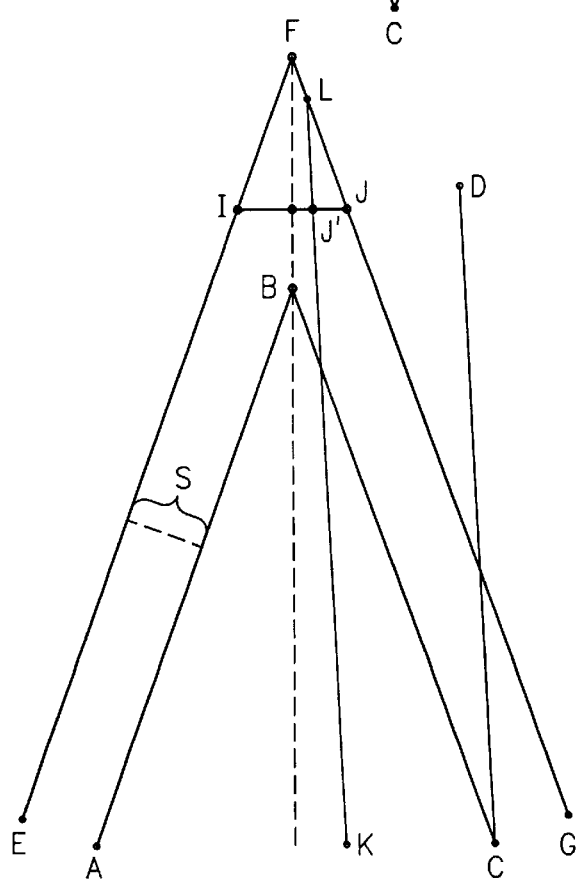
FIG. 9 is a further schematic view of a convexly configured landmass adjacent a concavely configured landmass and a process for correcting errors associated with the creation of fly-around boundaries for adjacent convex-concave configured landmasses.

In these situations, the originally offset computed fly-around boundary may need adjustment to adhere to the standoff distance S requirements for adjacent landmass configurations. With reference to FIG. 9 and step 78 of FIG. 4C, if the adjacent landmasses do switch from concave to convex or vice-versa, the process is forwarded to step 80 where the adjustments to the fly-around boundaries are performed in accordance with the diagram of FIG. 9 and the infinitely long fly around segments are trimmed at their intersection points to segments AB and BC. For the convexly configured landmass or coastline section represented by segments AB and BC, and defined by points A, B and C and for concavely configured landmass or coastline section represented by segments BC and CD, and defined by points B, C and D, steps 64–76, as described above, are performed. That is, as shown by FIG. 8, original fly-around segments EI, IJ and JG are calculated for convex landmass ABC via steps 70–76, forming landmass model boundary EIJG. Original fly-around segment KL is then offset the standoff distance from segment CD of concave filtered landmass model section BCD.

As shown in FIG. 9, point J and an additional portion of segment IJ of boundary EIJG violates the required predetermined value or standoff distance offset from segment CD. original fly-around segment KL intersects with original fly-around segment IJ of the fly-around boundary for filtered landmass model section ABC at point J'. Point J' does not violate the required standoff distance for segments BC or CD of the adjacent convex and concave filtered landmass model sections. The portions of fly-around boundary EIJG which violate the standoff distance S for segment CD are eliminated. Accordingly, segments J'J and JG are eliminated. In addition, segment KJ' is eliminated for it contains points which violate the standoff distance for segment BC. Thus, the new fly-around boundary for the landmass represented by points ABCD becomes boundary EIJ'L. In some cases, the geometry of adjacent convex/concave landmass segments will result in the fly-around boundary for the second segment of the concave segment, i.e., original fly-around segment KL for segment CD, encompassing both convex fly-around points, for example and not shown, points I and J. When this situation occurs fly-around point J' replaces both convex landmass fly-around points since both points would violate the fly-around boundary for segment CD. For segments of filtered landmass model or coastline sections changing from concave to convex configurations, the same fly-around adjustments as discussed above may be required.

Figure 10:
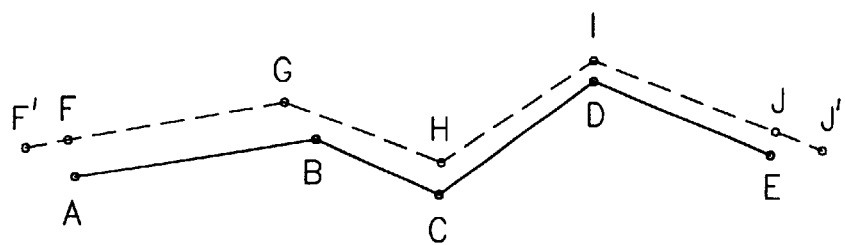
FIG. 10 is a diagram of a section of a non-island landmass illustrating the results of a process for extending end fly-around segments.

In step 81, the process is sent back to step 62 continuing through this loop until all data has been processed in accordance with steps 64–80, assuming the special conditions of steps 54–60 do not exist. If the data has been entirely processed, i.e., no new sets of three points are available, the process moves to step 82 whereat if the landmass is a multi-point island landmass, processing is ended. A multi-point island landmass is determined by the process when both the entrance and exit points of the landmass are the same. In step 84, however, if the landmass is a portion of a non-island landmass as shown in FIG. 10, including an entry point A and an exit point E, exit and entry original fly-around segments AB and DE coinciding with entry and exit fly-around points, A and E, respectively, are preferably extended. The exit and entry original fly-around segments AB and DE are extended outwardly a distance equal to the standoff distance, as shown in FIG. 10. The extension is done to estimate the fly-around boundary for the portion of the non-island landmass not being currently analyzed.

For sub-process 50 described above, the execution time can be reduced at the expense of increased memory allocation and decreased tactical capability. That is, fly-around boundaries could be calculated off-line, i.e., not real time, for a predefined set of distances corresponding to specific operating areas. These predefined distances which set the boundaries can be saved in memory 11 and displayed at a terminal (not shown) of computer 10, at the operator's request. Such a process would restrict the operator from launching missiles from other than the predefined operating areas and from using standoff distances other than the predefined distances.

Figure 11:
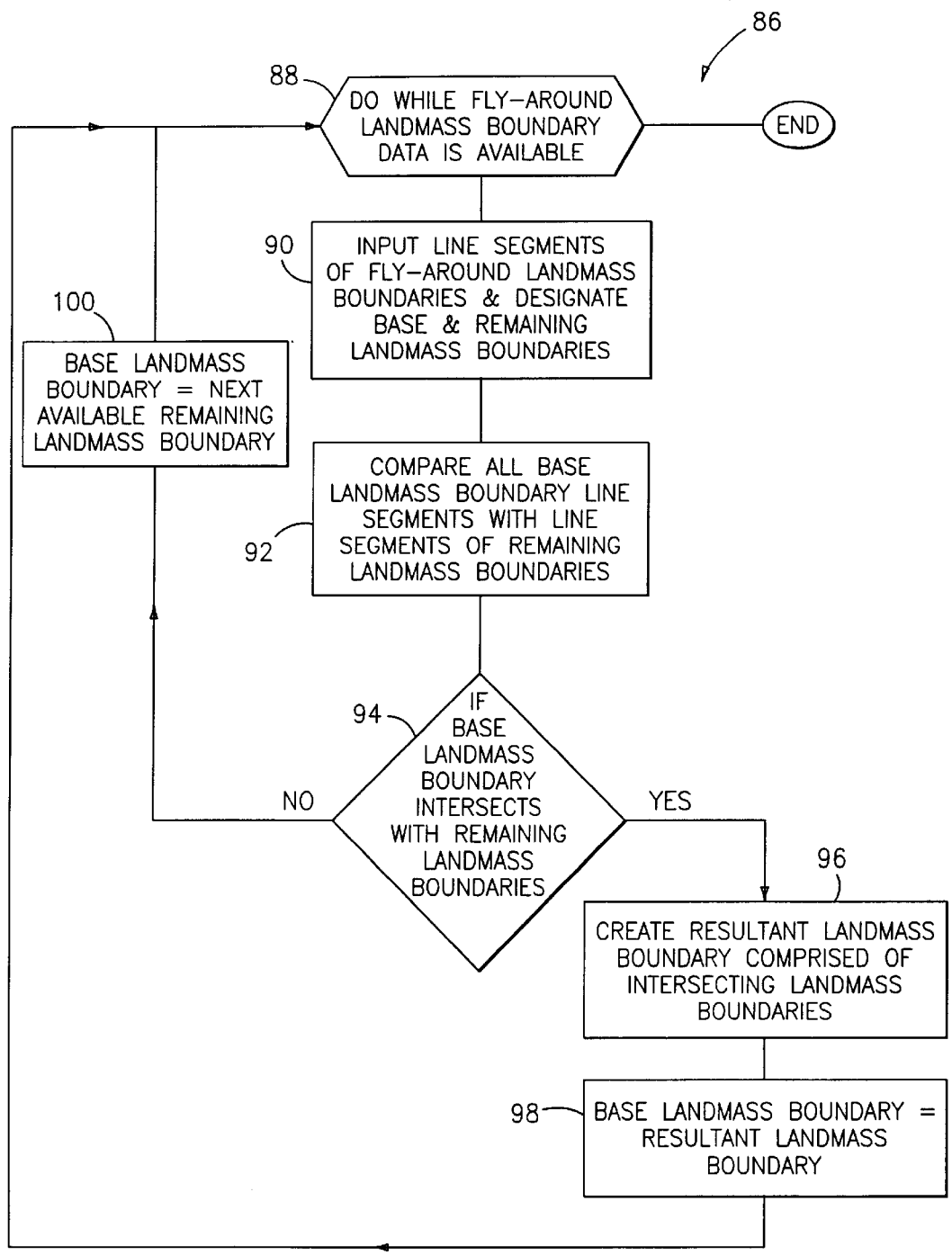
FIG. 11 is a flow diagram of a third tier of the process used by the present invention for combining fly-around boundaries of landmasses having intersecting boundaries.

Referring now to FIG. 11, sub-process 86 is disclosed for combining multiple fly-around landmass boundaries which overlap each other, into a single fly-around landmass boundary. Once such multiple overlapping landmass fly-around boundaries are combined, they are utilized by the navigational system shown in FIG. 1 for landmass boundary avoidance. Combining overlapping fly-around boundaries reduces the number of boundaries and boundary data points, which improves operability of the navigational system by decreasing the complexity of the flight path.

Overlapping boundaries occur when any points on two different original landmasses boundaries are less than twice the standoff distance from each other. Sub-process 86 is, therefore, used to combine all fly-around boundaries of all landmasses which intersect twice.

When intersection is found between the segments comprising the base landmass and remaining landmasses boundaries, a test using the dot product of the intersecting original fly-around segments is preferably used to determine if following the base landmass boundary through the intersection enters or exits the remaining landmass. The intersections are labelled as entry points e1 or exit points e2. The sign of the dot product of the intersecting segments is used to determine whether a right or left hand turn is made, wherein a right turn is an entry and a left turn an exit.

It should be noted that the dot product of two vectors is a standard mathematical formula which is defined to be the product of two vector lengths by the cosine of the angle between them. For our use, the dot product provides a simple way to find the angle between the intersecting landmass vectors. To determine if the remaining landmass vector is heading into or out of the base landmass, the intersecting angle between the vectors is measured. By normalizing the base segment vector and rotating it counterclockwise by 90 degrees, the dot product with the next landmass segment will result in either a positive (left turn/exit the base segment) or a negative (right turn/enter the base landmass) value. Determining the order of the points on the new combined landmass boundary and points to be eliminated from the original land mass boundaries is handled differently for each of the following cases.

When the boundaries being combined for both the base landmass B and remaining landmass R, are for island landmasses, i.e. closed polygons, as shown in FIG. 12A and they intersect exactly twice, the resultant combined landmass boundary is also in the shape of an island. The combined fly-around boundary is preferably formed by starting from the exit point e2, following the base landmass boundary clockwise to the entry point e1, then following the remaining landmass boundary back to the exit point e2.

If the base landmass B is an island type landmass and the remaining type landmass R is a coastal segment, i.e., a non-closed polyline, as shown in FIG. 12B, and the boundaries thereof intersect exactly twice, the resultant combined fly-around boundary is in the form of a coastal segment. The combined landmass boundary is preferably formed by following the remaining landmass boundary from the beginning, continuing along the remaining landmass boundary until the exit point e2, following the boundary of the base landmass to the entry point e1 and finally following the boundary of the remaining landmass to its end.

If the base landmass B is for a coastal segment and the remaining landmass R is an island, as shown in FIG. 12C, and the fly-around boundaries thereof intersect exactly twice, the resultant combined landmass fly-around boundary is in the shape of a coastal segment. The combined landmass is preferably formed by starting from the beginning of the base landmass boundary, following the base landmass boundary to the entry point e1, following the remaining landmass to the exit point e2 and finally following the base landmass to its end. The methodology illustrated in FIGS. 12A, 12B and 12C is facilitated by sub-process 86, as discussed below.

Figure 13A:
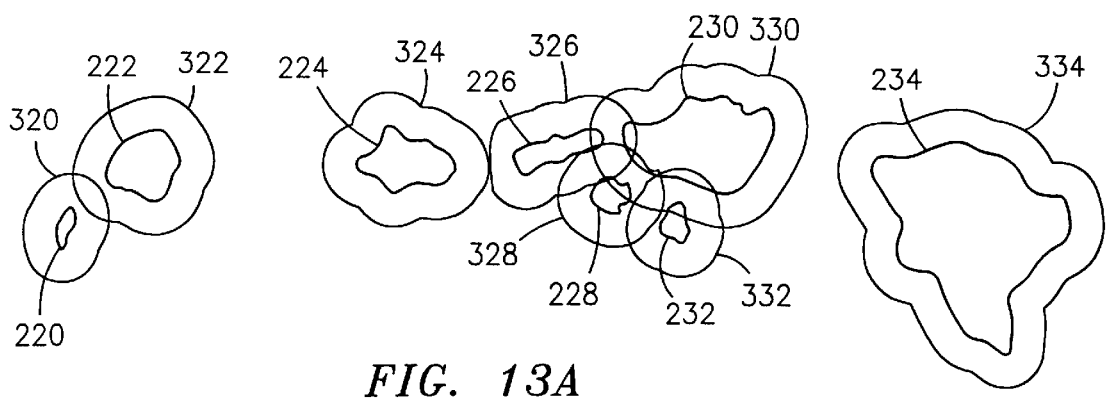
FIGS. 13A, 13B, 13C, 13D and 13E are diagrams showing the process for combining fly-around boundaries for a plurality of island type landmasses in accordance with the process of FIG. 10.

Step 88 of sub-process 86 acquires data from sub-process 50 representing generated fly-around boundaries for a plurality of landmasses such as, for example, island type landmasses 220, 222, 224, 226, 228, 230, 232 and 234 shown in FIG. 13A, having fly-around boundaries 320, 322, 324, 326, 328, 330, 332, and 334 as shown in FIG. 13A. Each boundary comprises a plurality of original fly-around segments. Referring to FIGS. 11 and 13, in step 90 a base landmass is designated, for example, landmass 220 and data representing the fly-around boundary of landmass 220 in the form of original fly-around segments and points and data representing the fly-around boundaries for all remaining landmasses are also inputted into the process.

In step 92, the segments forming the fly-around boundary of the base landmass, for example, boundary 320 is compared with the segments forming the fly-around boundaries of all remaining landmasses, for example boundaries 322–334 for determining if the original fly-around segments comprising the boundary of base landmass 220 intersect any fly-around segments comprising the fly-around boundaries of the remaining landmasses at two points. In step 94, the process is directed to step 96 if an intersection between the original fly-around segments of the base landmass and the original fly-around segments of the remaining landmasses are found at two points.

In step 96, a new base landmass and a new fly-around boundary is created from the segments forming the previous intersecting boundaries of the base landmass and remaining landmasses. That is, whenever the base landmass boundary intersects one of the remaining landmass boundaries, the intersecting remaining landmass boundary is incorporated into the base landmass boundary forming a new base landmass boundary 320' as set forth in step 98 of FIG. 11 and as shown in FIGS. 12A, 12B, 12C and 13B. Overlapping original fly-around segments and points trapped between the points of intersection, no longer boundary points, are thus eliminated creating the resultant fly-around boundary 320' for landmasses 220 and 222. The resultant fly-around boundary becomes the new base landmass boundary in FIG. 13B in step 98 of FIG. 11. The new base landmass boundary is then sent through the process steps 88 to 100 to again determine if any remaining landmass boundaries intersect with the new base landmass boundary.

Figure 13B:
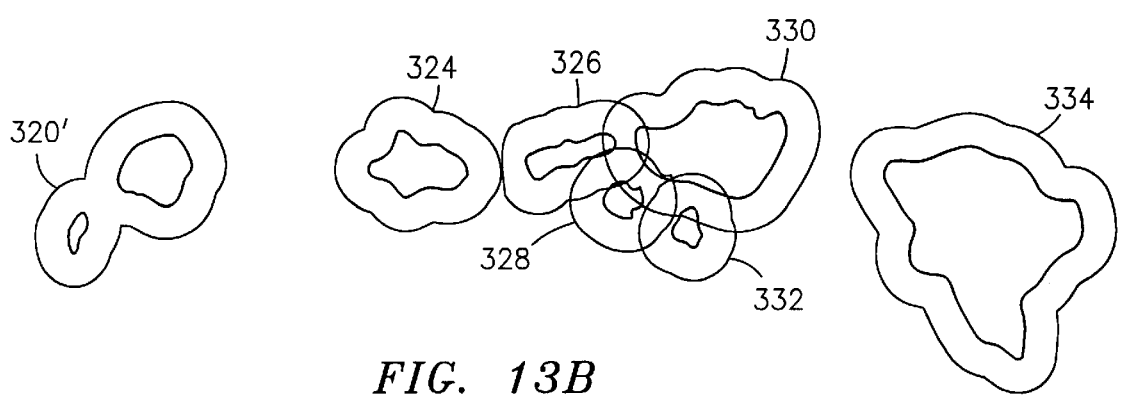
Figure 13C:
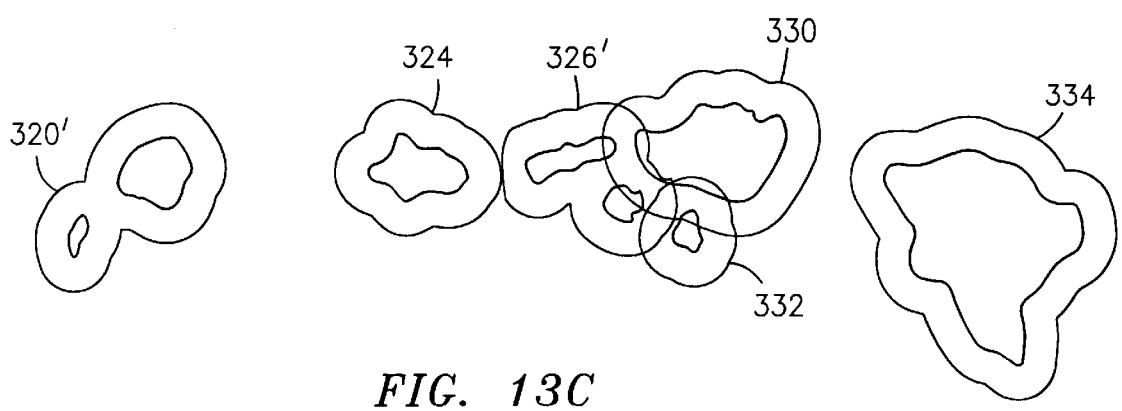

The process is preferably carried out comparing the segments of the landmass boundary or new base landmass boundary with the segments of the remaining landmass boundaries until either more than two line segments intersect or all the comparisons are complete, resulting in no intersection. Accordingly and referring to FIG. 13B, for example, new base landmass fly-around boundary 320' is sent through sub-process 86 for comparison with the fly-around boundaries of the remaining landmasses. In step 94, the segments of boundary 320' is determined not to intersect with segments of remaining boundaries 324–334 of landmasses 224–234. The process then proceeds to step 100 where the base landmass and its boundary is replaced by the next available landmass and boundary, i.e., landmass 224 and its boundary 324. Referring still to FIG. 13B, boundary 324 is now compared for intersections with the remaining landmass boundaries 326–334. Boundary 324 remains unchanged as boundary 324 does not intersect with any other landmass boundaries.

Figure 13D:
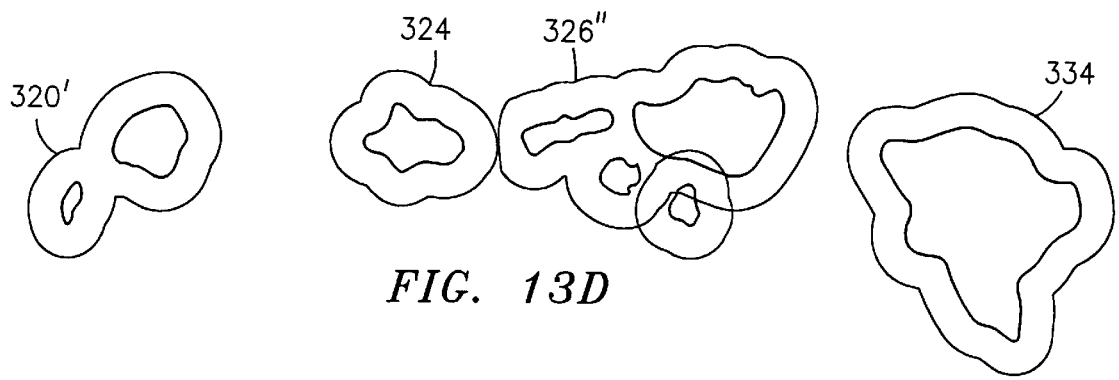
Figure 13E:
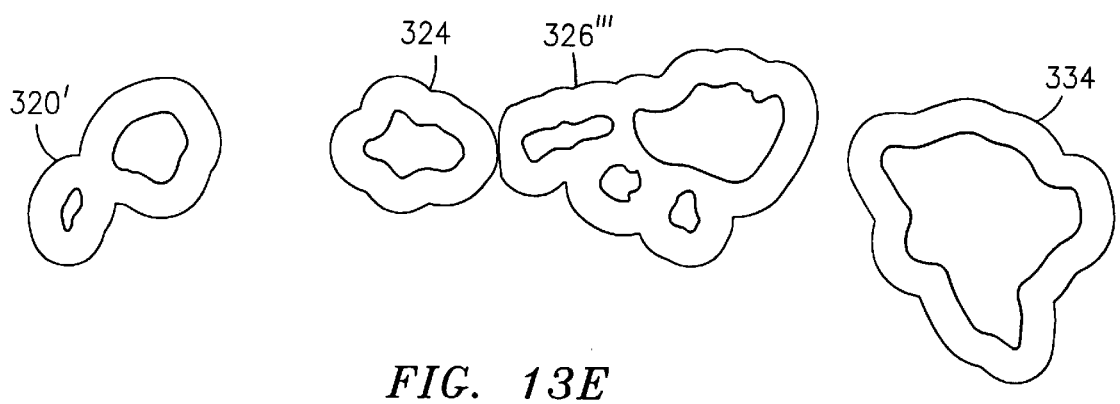

In step 100, landmass 226 and boundary 326 are designated the new base landmass and boundary and the process continues checking for intersection between the segments forming fly-around boundary 326 and the segments forming fly-around boundaries 328–334. Boundary 326 is combined with boundary 328, as shown in FIG. 13E, and as described above with regard to boundaries 320 and 322, and designated the new base landmass boundary 326' in step 98, wherein the points, original fly-around segments and portions thereof between the points of intersection are eliminated. In step 94, the segments forming base landmass boundary 326' intersect with the segments forming remaining landmass boundary 330, and thus a new base landmass boundary 326" is created in step 96 and designated again in step 98, as shown in FIG. 13D. The data is sent back through the loop and in step 94, the segments of base landmass boundary 326" are determined to intersect with the segments of remaining landmass boundary 332, and thus a new base landmass boundary 326'" is created in step 96, as shown in FIG. 13E and designated in step 98. Finally, the segments of base landmass boundary 326'" are checked for intersection with the segments of landmass boundary 334 and no intersection is found in step 94, leaving no more data available for step 88 and ending the process loop. The resulting fly-around boundaries are shown in FIG. 13E.

Upon completion of processing landmass boundary 326'", the process for combining fly-around boundaries for the landmasses indicated in FIGS. 13A, 13B, 13C, 13D and 13E is complete because (1) landmasses which have been combined into other landmass boundaries are never designated as a base landmass boundary and (2) the last landmass boundary in the sequence of landmass boundaries has already been checked for intersection with all landmasses boundaries and is not designated as the base landmass boundary.

The resultant landmass fly-around boundaries generated can be used in combination with non-intersecting fly around boundaries to achieve a desired flight path. For example, portions of resultant fly around boundaries 3201 and 336'" can be used in combination with other non-intersecting fly-around boundaries, coastal or otherwise, for forming a complete flight path for a missile or other projectile.

While computer 10 and its sub-processes 14, 50 and 86 are generally applicable to landmasses having oceanic coastlines, using cartographic data representative thereof, the process and sub-processes may also be applicable to inland coastlines adjacent rivers and lakes. In addition, the process may be applicable to inland landmass avoidance if the data is properly presented for use by the process.

The process is preferably implemented as a software program written in any applicable programming language. The program can be used by the computer for analyzing the data in accordance with the processes discussed above. Accordingly, each of the numbered boxes comprising the process steps of FIGS. 2A and 2B, 4A, 4B, and 4C and 11 can be performed by lines of code comprising the program.

The primary advantage of this invention is that an automated process is provided for determining fly-around boundaries relative to landmasses for use by missiles or the like. Another advantage of this invention is that an automated process is provided for creating fly-around boundaries which functions to optimize a flight path by eliminating small harbors and inlets of coastlines from a model of a landmass coastline. Still another advantage of this invention is that a process is provided for automatically creating fly-around boundaries based on a desired standoff distance from a landmass coastline. And still another advantage of this invention is that a process is provided for creating fly-around boundaries for landmasses, which combines the fly-around boundaries for adjacent intersecting landmass boundaries into a resultant fly-around boundary, depending upon the proximity of the landmasses.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for determining a fly-around boundary for use by projectiles as a flight path, comprising the steps of:

providing original cartographic data representative of at least one geographical position on a landmass and providing a predetermined value for the spacing of a fly-around boundary from said geographical position;

digitizing said original data in a format which includes latitudinal and longitudinal coordinates of said at least one geographical position;

providing a means for analyzing said digitized data;

inputting said digitized data and said predetermined value into said means for analyzing; and generating a fly-around boundary in digitized form from said predetermined value and said digitized data using said analyzing means.

2. The process according to claim 1 further comprising the steps of:

providing a navigational control means for steering the projectile; and inputting said generated fly-around boundary into said navigational control means.

3. The process according to claim 2 further comprising the step of removing a portion of said digitized data for simplifying a landmass model being generated from said digitized data.

4. The process according to claim 2 wherein said coordinates are in the form of at least a first set of three successive digitized points, said first set including a starting endpoint, a finishing endpoint and an intermediate point arranged in a directional configuration, said step of removing comprising the steps of:

categorizing said directional configuration represented by said first set as being a convex or concave configuration;

measuring the direct distance between said starting and said finishing endpoint of said first set if said first set has said concave configuration;

updating said digitized data representative of said landmass model if said first set has said concave configuration by eliminating said intermediate point of said first set from said first set when said direct distance is less than said predetermined value and retaining the remainder of said points of said first set; and reconfiguring said landmass model by connecting all remaining points of said first set by a segment and thereby creating a resultant landmass model.

5. The process according to claim 4 wherein said coordinates further include an entry point and an exit point and a second set of successive digitized points, the process comprising the steps of:

said analyzing said first and second sets of said three digitized points sequentially beginning with said entry point;

designating said finishing endpoint of said first set as a starting endpoint for said second set if said intermediate point is eliminated;

designating said intermediate point of said first set as a starting endpoint for said second set if said intermediate point of said first set is not eliminated; and repeating said steps of categorizing, measuring, updating and reconfiguring for said second set.

6. The process according to claim 5 wherein the process further comprises the steps of:

analyzing said resultant landmass model after the step of reconfiguring to locate any of said segments which cross over other segments at a point of intersection other than at an endpoint;

creating a new point at said point of intersection and adding said new point to said resultant landmass model; and eliminating any portions of said segments extending toward said landmass and projecting from said point of intersection and eliminating any segments connected with said portions, so that a near filtered landmass model is created comprising near filtered segments and points.

7. The process according to claim 6 wherein the process further comprises the steps of:

repeating the steps of inputting, categorizing, measuring, updating and reconfiguring for said near filtered points and said near filtered segments of said near filtered landmass model and creating a filtered landmass model having filtered segments and points.

8. The process according to claim 1 wherein said digitized data is a single point representative of said landmass, and wherein said step of generating further comprising the step of:

generating connected sides of a polygon around said single point, wherein a centerpoint of each of said sides is offset a distance equal to said predetermined value and said single point is at the center of said multi-sided figure, said sides representing original fly-around segments.

9. The process according to claim 1 wherein said landmass model includes two distinct endpoints connected by at least one line segment representative of said landmass, and wherein said step of generating further comprising the steps of:

generating connected sides of a multi-sided figure around each of said endpoints, wherein a center point of each of said sides is offset at a distance equal to said predetermined value and each of said endpoints is the center of one of said multi-sided figures, said sides representing original fly-around segments;

connecting said multi-sided figures with additional fly-around segments extending between said multi-sided figures on each side of said at least one line segment; and eliminating any points, connected sides or portions thereof located between said additional fly-around segments.

10. The process according to claim 7 wherein the filtered landmass model includes a landmass side and a water side, and wherein said step of generating further comprising the step of:

offsetting original fly-around segments from said filtered segments a distance equal to said predetermined value at an orientation substantially parallel to said filtered segments and toward said water side for setting said fly-around boundary.

11. The process according to claim 10 wherein said step of offsetting includes the steps of:

performing said step of offsetting in a sequential manner for at least first and second filtered segment sets each having two filtered segments, wherein said first filtered segment set includes a starting segment and a finishing segment and said finishing segment of said first filtered segment set becomes a starting segment for said second filtered segment set; and identifying if either or both of said first and second filtered segment sets form a convex configuration.

12. The process according to claim 11 further including the step of:

adjusting said fly-around boundary by correcting an offsetting error for either or both of said first and second filtered segment sets if either or both of said first and second filtered segment sets is identified as having said convex configuration.

13. The process according to claim 12 wherein a filtered segment set having said convex configuration has a vertex defined by one of said filtered points, and wherein said original fly-around segments offset from said filtered segments of said filtered segment set include an initial fly-around vertex offset from said landmass vertex a distance greater than the predetermined value, said process further including:

said step of adjusting comprising generating a new fly-around segment offset from said landmass a distance equal to said predetermined value and substantially perpendicular to a line extending between said landmass vertex and said initial fly-around vertex such that said new fly-around segment intersects with said original fly-around segments and an extra portion of each of said original fly-around segments offset from said filtered segment set having said convex configuration extends beyond said new fly-around segment toward said initial fly-around vertex; and eliminating each extra portion and any points associated with each said extra portion and forming a new fly-around boundary.

14. The process according to claim 11 further comprising the step of:

correcting an additional error associated with performing the step of offsetting for said first and second filtered segment sets when said first and second filtered segment sets form consecutively arranged convex and concave configurations.

15. The process according to claim 14 wherein said additional error occurs when at least one of said original fly-around segments is offset from one of said filtered segments of said first filtered segment set at said predetermined value and said at least one of said original fly-around segments of said first filtered segment set violates a required offset at said predetermined value from a filtered segment of said second filtered segment set, and wherein said additional error correcting step comprises:

determining a point of intersection between original fly-around segments offset from said filtered segment of each of said first and second filtered segment sets, wherein at least one of said original fly-around segments of said first filtered segment set includes a portion which violates said required predetermined value offset from said filtered segment of said second filtered segment set; and eliminating said portion of said first filtered segment set which violates said required predetermined value offset of said second filtered segment set.

16. The process according to claim 10 wherein said landmass represented by said digitized data is in the form of a portion of a non-island landmass and said fly-around boundary includes an entry original fly-around segment and exit original fly-around segment coinciding with exit and entry points of said filtered landmass model, said process further comprising the step of:

extending each of said entry and exit original fly-around segments by an amount equal to said predetermined value.

17. The process according to claim 13 wherein said cartographic data is provided for a plurality of landmasses, said process further comprising the steps of:

determining fly-around boundaries for each of said plurality of landmasses; and combining the fly-around boundaries of at least two of said plurality of landmasses and creating a resultant fly-around boundary.

18. The process according to claim 17 wherein said step of combining the fly around boundaries further includes the steps of:

designating a fly-around boundary of one of said plurality of landmasses a base landmass boundary and designating a fly-around boundary of at least one of said plurality of landmasses a remaining landmass boundary;

determining points of intersection between said base landmass boundary and said remaining landmass boundary, wherein said points of intersection trap at least one of an inner fly-around point, an original fly-around segment and a portion of said original fly-around segment therebetween belonging to said base landmass boundary and said remaining landmass boundary; and eliminating at least one of said inner fly-around point, said original fly-around segment, and said portion of said original fly-around segment for completing said resultant fly-around boundary.

19. The process according to claim 18 wherein said step of combining the fly-around boundaries further comprises the steps of:

redesignating said resultant fly-around boundary as a new base landmass boundary; and repeating said steps of determining points of intersection and eliminating for said new base landmass boundary and any of said remaining landmass boundaries.

20. The process according to claim 18 further comprising the steps of:

redesignating a non-intersecting one of said remaining landmass boundaries a new base landmass boundary if no intersection between the base landmass boundary and said remaining landmass boundary is found; and repeating said steps of determining points of intersection and eliminating for said new base landmass boundary and any remaining landmass boundaries.

* * * * *